US012169114B2

(12) United States Patent
Porat

(10) Patent No.: US 12,169,114 B2
(45) Date of Patent: Dec. 17, 2024

(54) CHARGING HANDLE WITH ILLUMINATION DEVICE

(71) Applicant: Recover Innovations Ltd., Tel Aviv (IL)

(72) Inventor: Tamir Porat, Tel Aviv (IL)

(73) Assignee: RT Recover Innovations Ltd., Tel Aviv (IL)

( * ) Notice: Subject to any disclaimer, the term of this patent is extended or adjusted under 35 U.S.C. 154(b) by 147 days.

(21) Appl. No.: 18/047,347

(22) Filed: Oct. 18, 2022

(65) Prior Publication Data

US 2023/0131610 A1 Apr. 27, 2023

(30) Foreign Application Priority Data

Oct. 21, 2021 (IL) .......................................... 287506

(51) Int. Cl.

| | |
|---|---|
| ***F41C 27/00*** | (2006.01) |
| ***F21V 33/00*** | (2006.01) |
| *F21Y 115/10* | (2016.01) |

(52) U.S. Cl.

CPC ............ *F41C 27/00* (2013.01); *F21V 33/008* (2013.01); *F21Y 2115/10* (2016.08)

(58) Field of Classification Search

CPC ..... F41C 27/00; F21B 33/008; F21Y 2115/10

USPC .............................................................. 42/90

See application file for complete search history.

(56) References Cited

U.S. PATENT DOCUMENTS

| | | | | |
|---|---|---|---|---|
| 7,509,766 | B2 * | 3/2009 | Vasquez | F41A 19/01 42/1.05 |
| 9,194,654 | B1 * | 11/2015 | Viani | F41C 27/00 |
| 10,837,737 | B1 * | 11/2020 | Wright | F41G 1/08 |
| 2013/0180152 | A1 * | 7/2013 | Speroni | F41G 1/35 42/99 |

* cited by examiner

*Primary Examiner* — Samir Abdosh

(74) *Attorney, Agent, or Firm* — Dekel Patent Ltd.; David Klein

(57) ABSTRACT

A firearm slide accessory includes a charging handle attachment including a first member and a second member. The first and second members are formed with one or more mounting holes through which pass one or more fasteners. The first member includes an illumination device.

11 Claims, 2 Drawing Sheets

CHARGING HANDLE WITH ILLUMINATION DEVICE

FIELD OF THE INVENTION

The present invention relates generally to weapons and weapon accessories, and particularly to a charging handle attachment that has a built-in flashlight.

BACKGROUND OF THE INVENTION

Police officers and other individuals who use guns in dark conditions often desire a portable light to illuminate their surroundings. A handheld light, such as a flashlight, can provide illumination, but it becomes unmanageable when the gun user must use both hands to control the gun. Accordingly, many weapon manufacturers today manufacture and market weapons with provisions for mounting a light on the weapon. For example, the major handgun manufacturers, such as Springfield Armory, Glock, SIG and many others, make handguns with a light mounting rail formed on the pistol or rifle frame, such as on the underside or top or both sides of the barrel. Such a mounting rail is often referred to in the art as a "light rail" (or a MIL-STD M-1913 (Picatinny) rail, or "universal rail", or "tactical rail", or "accessories rail", the terms being used interchangeably throughout the specification and claims). The accessories rail has been used for mounting white lights, infrared and laser illuminating devices and telescopic sights, for example. In many weapons, the mounting rail is integral with the weapon.

SUMMARY OF THE INVENTION

The present invention seeks to provide a charging handle attachment that has a built-in flashlight (also referred to as an illumination device), as is described more in detail hereinbelow. The terms firearm and weapon and used interchangeably throughout.

The charging handle attachment provides powerful illumination without the need for purchasing an extra flashlight or multiple holsters for a different light for mounting on the accessories rail of the firearm. The charging handle attachment allows optical accessories to be mounted thereon securely for use in any tactical situation.

There is provided in accordance with an embodiment of the invention a firearm slide accessory including a charging handle attachment including a first member and a second member, the first and second members being formed with one or more mounting holes through which pass one or more fasteners, wherein the first member includes an illumination device.

In accordance with an embodiment of the invention the illumination device includes a light emitting diode (LED). The illumination device may include a white-light LED or a colored-light LED.

In accordance with an embodiment of the invention the illumination device produces continuous light, pulsed light, or strobe light.

In accordance with an embodiment of the invention there are two illumination devices, each mounted in first and second extensions that extend from the first member.

In accordance with an embodiment of the invention there is a gap between the first and second extensions.

In accordance with an embodiment of the invention the first and second members are formed with apertures through which a sight can protrude.

In accordance with an embodiment of the invention the charging handle attachment includes a battery compartment.

In accordance with an embodiment of the invention the charging handle attachment includes a switch (e.g., on-off switch or mode switch).

In accordance with an embodiment of the invention at least one of the upper and lower members is formed with external serrations.

BRIEF DESCRIPTION OF THE DRAWINGS

The present invention will be understood and appreciated more fully from the following detailed description taken in conjunction with the drawings in which.

DETAILED DESCRIPTION

Figure 1:
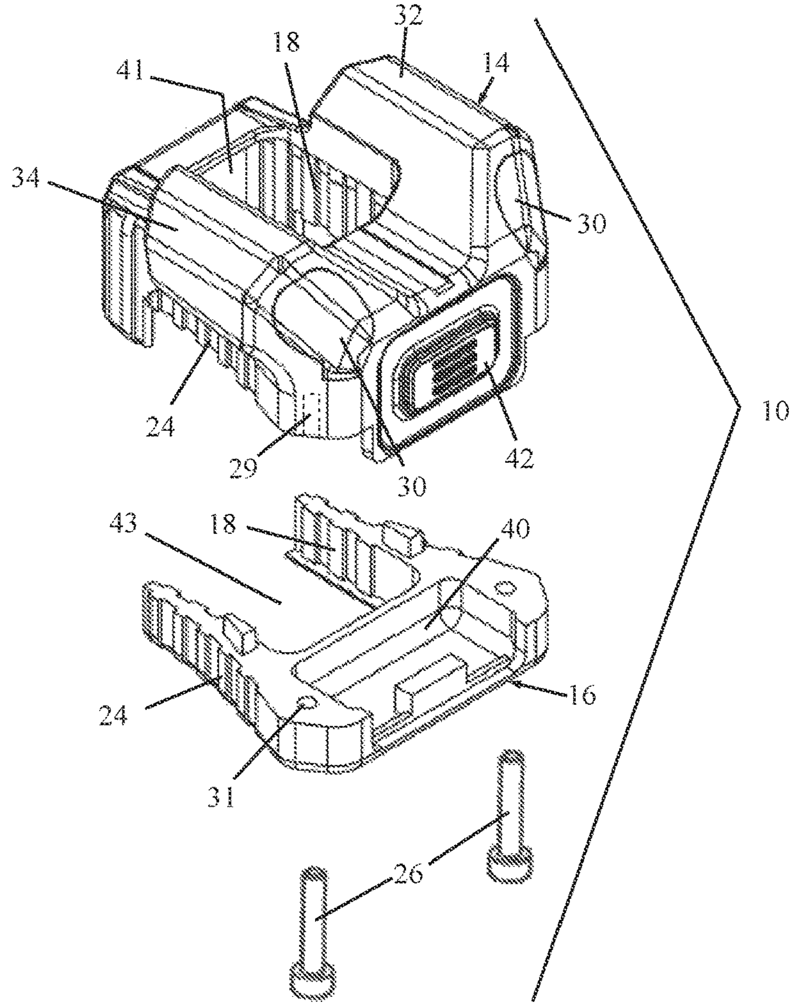
FIGS. 1, 2 and 3 are simplified, exploded, pictorial, and front-view illustrations, respectively, of a charging handle with a built-in illumination device, in accordance with a non-limiting embodiment of the present invention.
Figure 2:
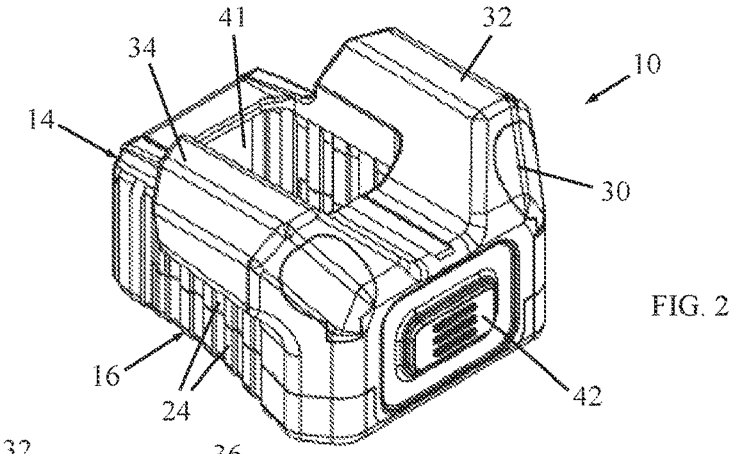
Figure 3:
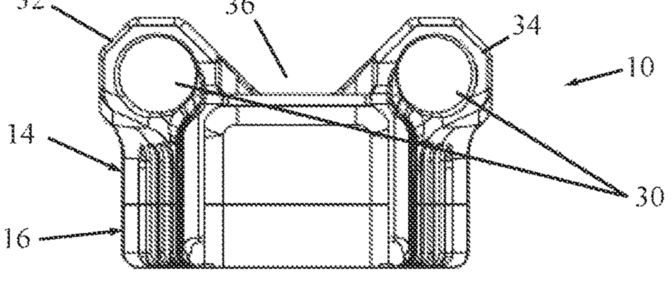

Reference is now made to FIGS. 1-3, which illustrate a charging handle attachment 10 for use with a firearm 12 (FIGS. 4A-4B), constructed and operative in accordance with a non-limiting embodiment of the present invention.

The charging handle attachment 10 may include a first member 14 and a second member 16. In the illustrated embodiment, the first member 14 is the upper member and the second member 16 is the lower member; upper and lower being in the sense of the firearm, that is, upper corresponds to the upper surface of the slide and lower corresponds to the lower surface of the slide. However, alternatively, the first member 14 may be the left or right member and the second member 16 may be the right or left member. Both the first and second members 14 and 16 may be formed with internal serrations 18 that mate with external serrations 19 of a slide 22 of firearm 12 (seen in FIG. 4A). In this manner, both the first and second members 14 and 16 are positively secured to slide 22. Alternatively, one or both of the first and second members 14 and 16 may not be formed with internal serrations and instead may be smooth or have other texture.

Both the first and second members 14 and 16 may also be formed with external serrations 24 that match the external serrations of the slide 22 so as to give an aesthetically pleasing texture to the charging handle attachment 10 that blends with the original serrations of the slide.

The first and second members 14 and 16 are secured together with one or more fasteners 26, such as screws. For example, the first and second members 14 and 16 may be formed with one or more mounting holes 29 and 31 (FIG. 1), respectively, to accept the one or more fasteners 26 (one set of the holes, such as holes 29, may be tapped to accept the fasteners so that no nuts are needed; other fasteners may be used, such as but not limited to, screws 26 with nuts, pins or rivets and others). The fasteners 26 ensure that the charging handle attachment 10 is properly secured to slide 22 (FIGS. 4A-4B) and will not budge during years of use.

The first and second members 14 and 16 may be made of any suitable material, such as but not limited to, polymer, aluminum alloy, steel alloy, elastomer and the like. The first and second members 14 and 16 may have the same color as slide 22 or may be made of different colors.

The first member 14 may include, such as on an upper face thereof, at least one illumination device 30, such as but not limited to, a light emitting diode (LED). For example, the LED may be a white-light LED that produces, without limitation, a 600 or 800-lumen beam that projects over 200 meters. The LED may alternatively be a colored-light LED. The illumination device 30 may produce continuous light, or may alternatively include a pulsed light mode or a strobe light mode.

Figure 4A:
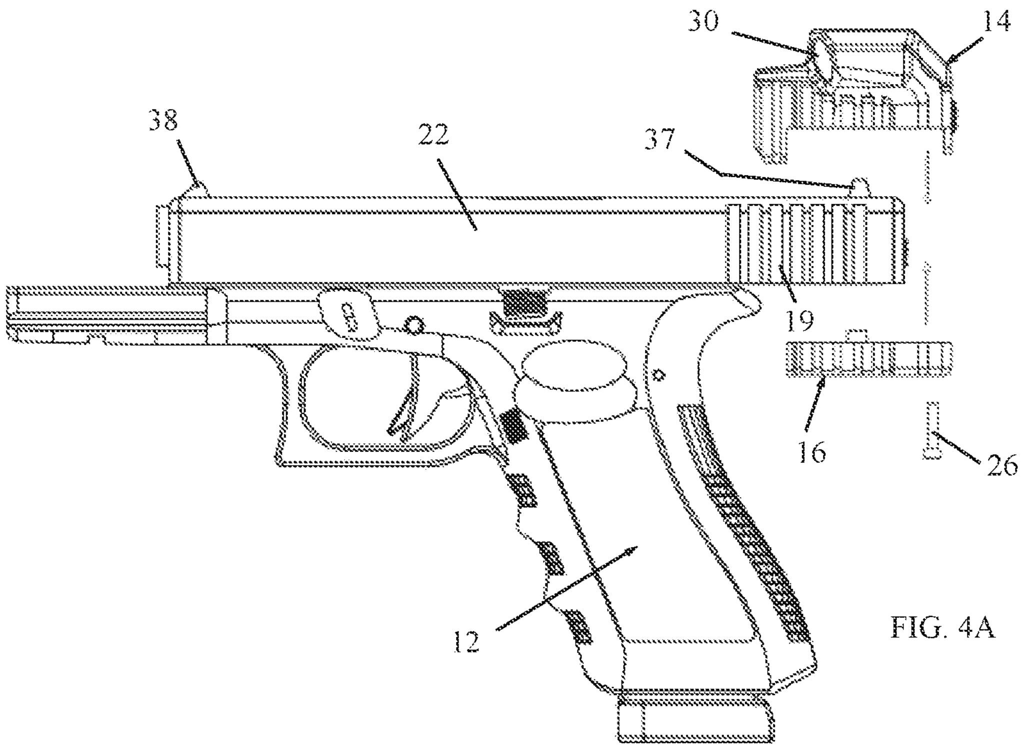
FIGS. 4A and 4B are simplified side-view and pictorial illustrations, respectively, of the charging handle about to be attached and completely attached to the slide of a firearm.
Figure 4B:
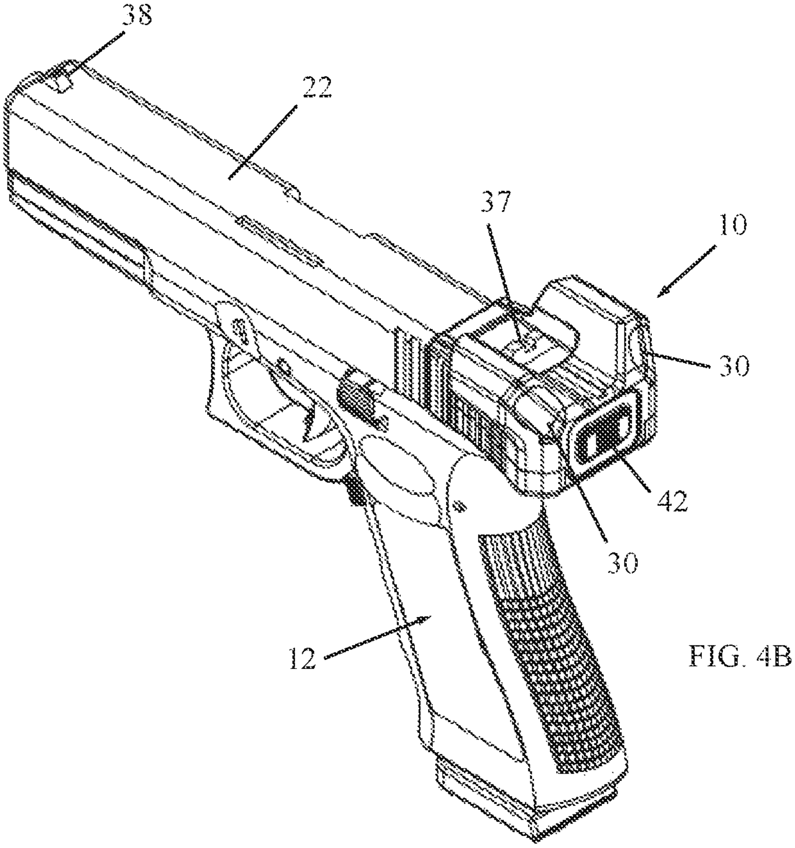

In the illustrated embodiment, there are two illumination devices 30, each mounted in first and second extensions 32 and 34 that extend from first member 14. There is a gap 36 (FIG. 3) between first and second extensions 32 and 34 so that the shooter is not blocked from seeing the sights 37 and 38 of the firearm 12 (FIGS. 4A-4B). The first and second members 14 and 16 may be formed with apertures 41 (FIGS. 1 and 2) and 43 (FIG. 1), respectively, through which the sight 37 can protrude.

The charging handle attachment 10 may include a battery compartment 40 (FIG. 1) and an on/off switch 42 (or a mode switch to switch between different illumination modes, such as continuous light, pulsed light or strobe light). Current technologies allow for a variety of battery options; some may use without limitation, a button-size lithium-cell battery.

The installation is straightforward. After making a safety check on firearm 12 to make sure it is clear of ammunition, the slide 22 may be pulled and locked to the rear. The first and second members 14 and 16 may then be fastened to the slide 22 with fasteners 26.

What is claimed is:

1. A firearm slide accessory comprising:

a charging handle attachment comprising a first member and a second member, said first and second members being formed with one or more mounting holes through which pass one or more fasteners;

wherein said first member comprises an illumination device, and wherein said illumination device comprises two illumination devices, each mounted in first and second extensions that extend from said first member.

2. The firearm slide accessory according to claim 1, wherein said illumination device comprises a light emitting diode (LED).

3. The firearm slide accessory according to claim 1, wherein said illumination device comprises a white-light LED.

4. The firearm slide accessory according to claim 1, wherein said illumination device comprises a colored-light LED.

5. The firearm slide accessory according to claim 1, wherein said illumination device produces continuous light.

6. The firearm slide accessory according to claim 1, wherein said illumination device produces pulsed light.

7. The firearm slide accessory according to claim 1, wherein said illumination device produces strobe light.

8. The firearm slide accessory according to claim 1, wherein there is a gap between said first and second extensions.

9. The firearm slide accessory according to claim 1, wherein said first and second members are formed with apertures through which a sight can protrude.

10. The firearm slide accessory according to claim 1, wherein said charging handle attachment comprises a battery compartment.

11. The firearm slide accessory according to claim 1, wherein said charging handle attachment comprises a switch.

* * * * *